(12) United States Patent
Chan

(10) Patent No.: US 7,342,776 B1
(45) Date of Patent: Mar. 11, 2008

(54) PORTABLE ELECTRONIC APPARATUS HAVING AN EXTENDABLE KEYBOARD

(75) Inventor: Tien-Ming Chan, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/711,802

(22) Filed: Feb. 28, 2007

(51) Int. Cl.
*G06F 1/16* (2006.01)

(52) U.S. Cl. .................. 361/680; 361/683; 345/169
(58) Field of Classification Search ........ 361/679–683; 345/169
See application file for complete search history.

(56) References Cited

U.S. PATENT DOCUMENTS

| | | | | |
|---|---|---|---|---|
| 4,980,676 A | * | 12/1990 | Nomura et al. | 361/680 |
| 5,539,615 A | * | 7/1996 | Sellers | 361/680 |
| 5,818,360 A | * | 10/1998 | Chu et al. | 341/22 |
| 5,918,957 A | * | 7/1999 | Bovio et al. | 312/223.2 |
| 6,442,018 B1 | * | 8/2002 | Dinkin | 361/683 |
| 6,483,445 B1 | * | 11/2002 | England | 341/22 |
| 6,556,430 B2 | * | 4/2003 | Kuo et al. | 361/680 |
| 7,016,182 B2 | * | 3/2006 | Brandenberg et al. | 361/683 |
| 2005/0052831 A1 | * | 3/2005 | Chen | 361/680 |
| 2005/0213744 A1 | * | 9/2005 | Valli | 379/368 |
| 2006/0104013 A1 | * | 5/2006 | Sakakibara et al. | 361/680 |

\* cited by examiner

*Primary Examiner*—Jayprakash Gandhi
*Assistant Examiner*—Anthony Q Edwards
(74) *Attorney, Agent, or Firm*—Bacon & Thomas, PLLC

(57) ABSTRACT

The present invention is to provide a portable electronic apparatus having an extendable keyboard which comprises a main body having a storage slot extends inwardly at a front edge of the main body for slidably accommodating a keyboard and enabling the keyboard to be slidably pulled to a position out of the storage slot and then be turned towards a top side of the main body.

6 Claims, 5 Drawing Sheets

PORTABLE ELECTRONIC APPARATUS HAVING AN EXTENDABLE KEYBOARD

FIELD OF THE INVENTION

The present invention relates to a portable electronic apparatus having an extendable keyboard, and more particularly to a portable electronic apparatus comprising a main body, of which a storage slot extends inwardly at a front edge of the main body for slidably accommodating a keyboard and two sliding parts wherein, while the keyboard slides to a position fully out of the storage slot, a plurality of buttons on one side of the keyboard are exposed out of the storage slot and the keyboard is able to turn towards a top side of the main body.

BACKGROUND OF THE INVENTION

The world today enters into an era of information and electronic industry, all kinds of high-tech products and electronic apparatuses derived from microcomputer evolve quickly and bring great convenience to people's daily life. And the requirements towards the electronic products increase as all kinds of electronic technologies constantly advance. It takes not only high quality but also great convenience for electronic products to stand out among competition. All kinds of electronic products have become necessities either in people's daily life or at work while the wireless LANs are fast established.

The market of high-tech products today is the one with intense competition, and computers are most welcomed among all of the high-tech products. There's a kind of computer called "Ultra-mobile PC" (UMPC for short) featured compactness, portability and capability of processing information. The size of the UMPC is between those of a personal digital assistant (PDA for short) and a notebook, and it combines the functions of PDA, personal mobile player and digital walkman as well as provides the same operating system as the notebook does. Owing to its compactness and all of the additional features constantly developed, the UMPC has become one of the new products widely noticed.

Please refer to FIG. 1, a conventional UMPC comprises a main body 10 and a base 11, wherein a touch screen 100 is embedded on the front side of the main body 10, at both sides of the touch screen 100 of the main body 10 are plurality of control buttons 101 for users to control and operate UMPC 1, and the main body 10 is pivotally coupled to the base 11 to stand on the desk or other plane surface. Such UMPC 1 typically utilizes the touch screen 100 for input of data or command, but an external keyboard 13 may be connected to UMPC 1 to facilitate the data input.

However, there exist defects contrary to the product features of such conventional UMPC 1. First, to enhance the speed of input, users are required to buy an extra keyboard 13, but most of the users intend to buy multi-functional and user-friendly electronic products with a reasonable price. Second, the main body 10 must be pivotally coupled to the base 11 to stand on the desk or other plane surface, which makes the components of the UMPC 1 more complicated and increases the thick of it substantially as well. Besides, it is also inconvenient for users to carry the UMPC 1 and keyboard 13 at the same time. Thus, the UMPC 1 will be more competitive if the defects stated above are improved.

SUMMARY OF THE INVENTION

For the purpose of solving the defects of using, placing and carrying said UMPC, after hark work of research and experiments for a long time, the inventor has developed a portable electronic apparatus having an extendable keyboard of the present invention.

One of the objectives of the present invention is to provide a portable electronic apparatus having an extendable keyboard which comprises a main body, wherein a storage slot extends inwardly at a front edge of the main body. A first limit part and a second limit part are disposed at both sides of the storage slot near the front edge of the main body. Besides, the portable electronic apparatus further comprises a keyboard and two sliding parts, wherein the keyboard is disposed between both sides of the storage slot and a plurality of buttons are disposed on one side of the keyboard. One end of each sliding part is pivotally coupled to one side of the keyboard respectively while the other end of each sliding part extends towards one side of the storage slot and slidably coupled to the corresponding side of the storage slot respectively. Said plurality of buttons are exposed out of the storage slot while the sliding parts slide to positions corresponding to the first limit part, and the keyboard may be turned towards a top side of the main body while the sliding parts slide to positions corresponding to the second limit part. Thereby, the problems of using, placing and carrying conventional keyboard would be solved.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENT

Figure 1:
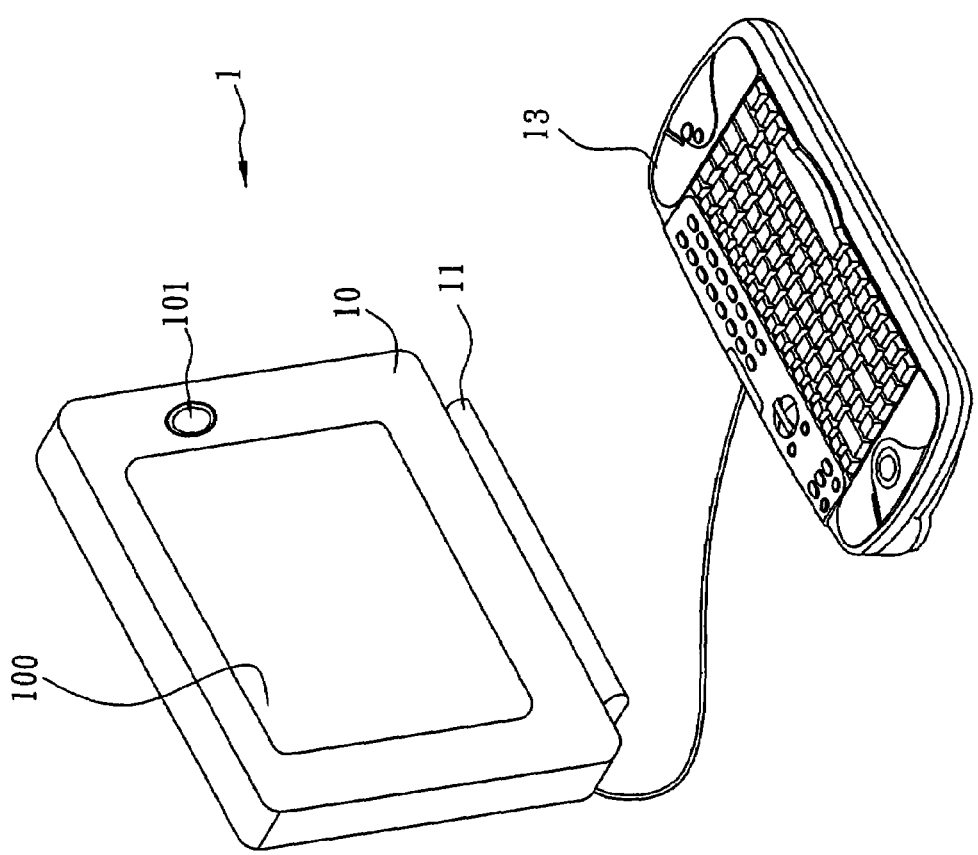
FIG. 1 shows the conventional Ultra-mobile PC.
Figure 2:
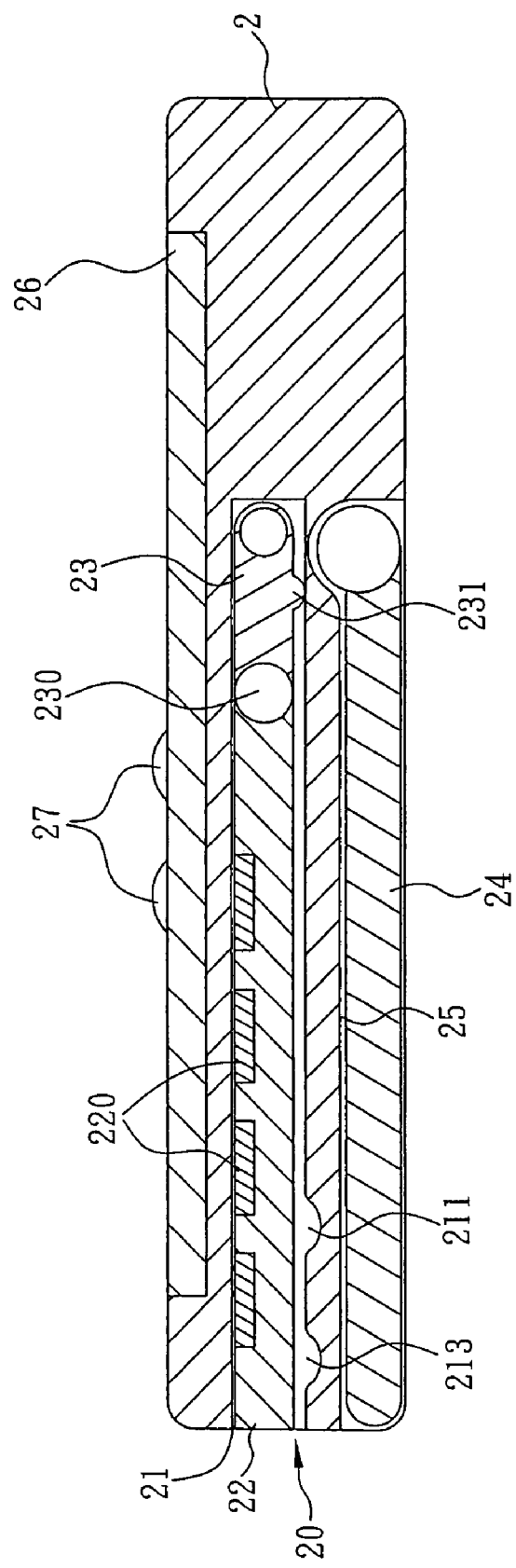
FIG. 2 shows the portable electronic apparatus having an extendable keyboard of a preferred embodiment of the present invention.

Please refer to FIG. 2, the present invention is a portable electronic apparatus having an extendable keyboard which comprises a main body 2, a keyboard 22 and two sliding parts 23. A storage slot 21 extends inwardly at a front edge 20 of the main body 2, and a first limit part 211 is disposed at both sides of the storage slot 21 near the front edge 20 of the main body 2 while a second limit part 213 is disposed at both sides of the storage slot 21 between the first limit part 211 and the front edge 20 of the main body 2. The keyboard 22 is disposed between both sides of the storage slot 21 and a plurality of buttons 220 are disposed at one side of the keyboard 22. The sliding parts 23 are disposed between the keyboard 22 and both sides of the storage slot 21 respectively, and one end of each sliding part 23 is pivotally coupled to one side of the keyboard 22 while the other end of each sliding part 23 extends towards one side of the storage slot 21 and is slidably coupled to the corresponding side of the storage slot 21 for the keyboard 22 to slide into or out of the storage slot 21.

Figure 3:
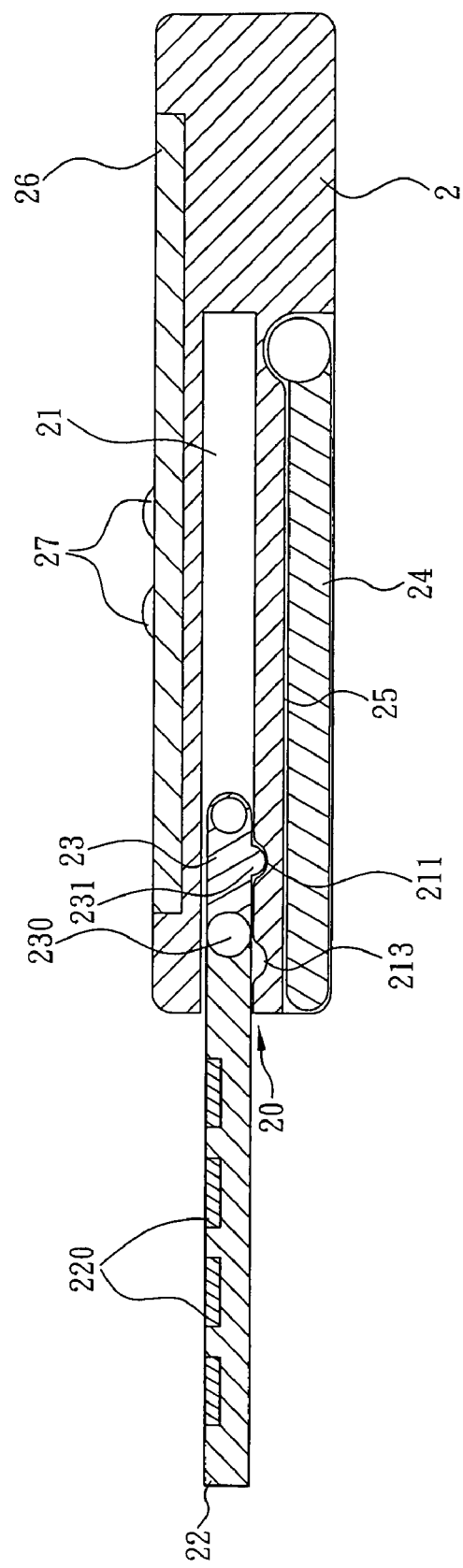
FIG. 3 shows the portable electronic apparatus having an extendable keyboard in use of a preferred embodiment of the present invention.

Please refer to FIG. 3, when two sliding parts 23 slide to the locations which correspond to the first limit part 211, said plurality of buttons will slide out of the storage slot 21 for users to input data or commands. Please refer to FIG. 4, sliding the two sliding parts 23 to the locations which correspond to the second limit part 213 would allow the keyboard 23 to be turned towards a top side of the main body 2, thus enabling users to input data or commands with the keyboard 22 while standing the main body 2 on the plane surface. Thereby, the problems of using, placing and carrying conventional keyboard would be solved and the space occupied by the conventional keyboard would be saved.

Figure 5:
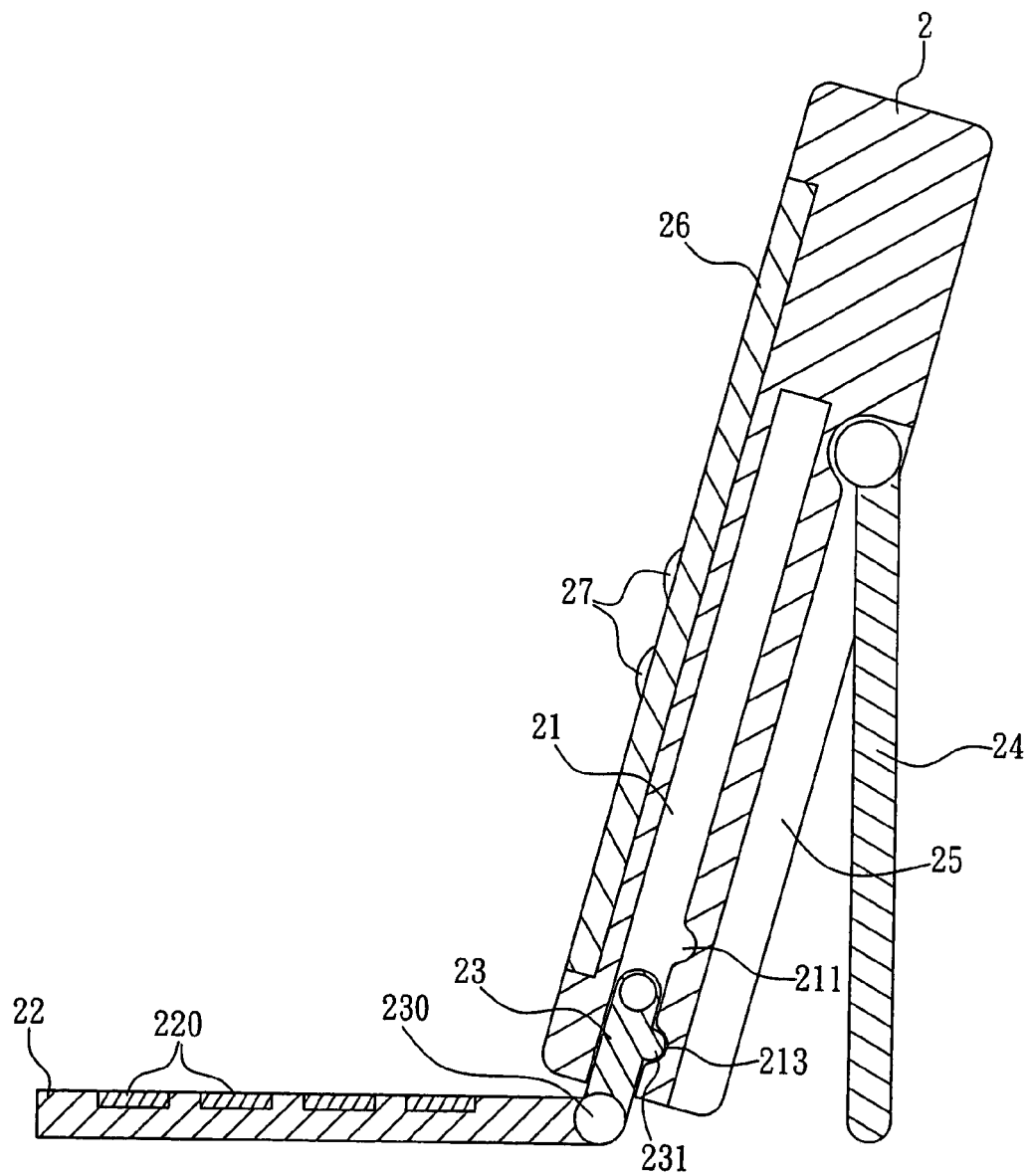
FIG. 5 again shows the portable electronic apparatus having an extendable keyboard in use of a preferred embodiment of the present invention.

Please refer to FIG. 5, in one embodiment of the present invention, a support part 24 is further pivotally coupled to the bottom side of the main body 2 where the support part 24 may be pivoted for one end of the support part 24 to be separated from the bottom side of the main body 2. When one end of the support part 24 is separated from the bottom side of the main body 2 and the keyboard 22 is turned towards the top side of the main body 2, the main body 2 may stand on the plane surface with the support of the support part 24 while the keyboard 22 is laying on the plane surface, thus enabling users to input data or commands with the keyboard 22 while watching the portable electronic apparatus.

Please refer to FIG. 2, in said embodiment, one end of each sliding part 23 is pivotally coupled to the keyboard 22 at a pivot point 230. While the sliding parts 23 slide to the locations that the pivot point 230 corresponds to the first limit part 211, said plurality of buttons 220 would slide out of the storage slot 21, but because pivot point 230 is still within the storage slot 21, there's no way for the keyboard 22 to be turned. On the other hand, the keyboard 22 may be turned towards the top side of the main body 2 while the sliding parts 23 slide to the locations that the pivot point 230 corresponds to the second limit part 213 since the keyboard 22 and the pivot point 230 have slid out of the storage slot 21 completely.

Please refer to FIG. 3, in said embodiment, a restraint part 231 is disposed between the two ends of each of the sliding part 23 respectively. The restraint part 231 engages with the first limit part 211 while the two sliding parts 23 slide outwardly, which makes the sliding parts 23 positioning at a location within the storage slot 21 and the keyboard 22 positioning at the location that said plurality of buttons 220 are exposed out of the storage slot 21. And the keyboard 22 may not be turned since the pivot point 230 is still inside of the storage slot 21. Thus, users may utilize the buttons 220 to input data or commands while the portable electronic apparatus is laying on the plane surface.

Figure 4:
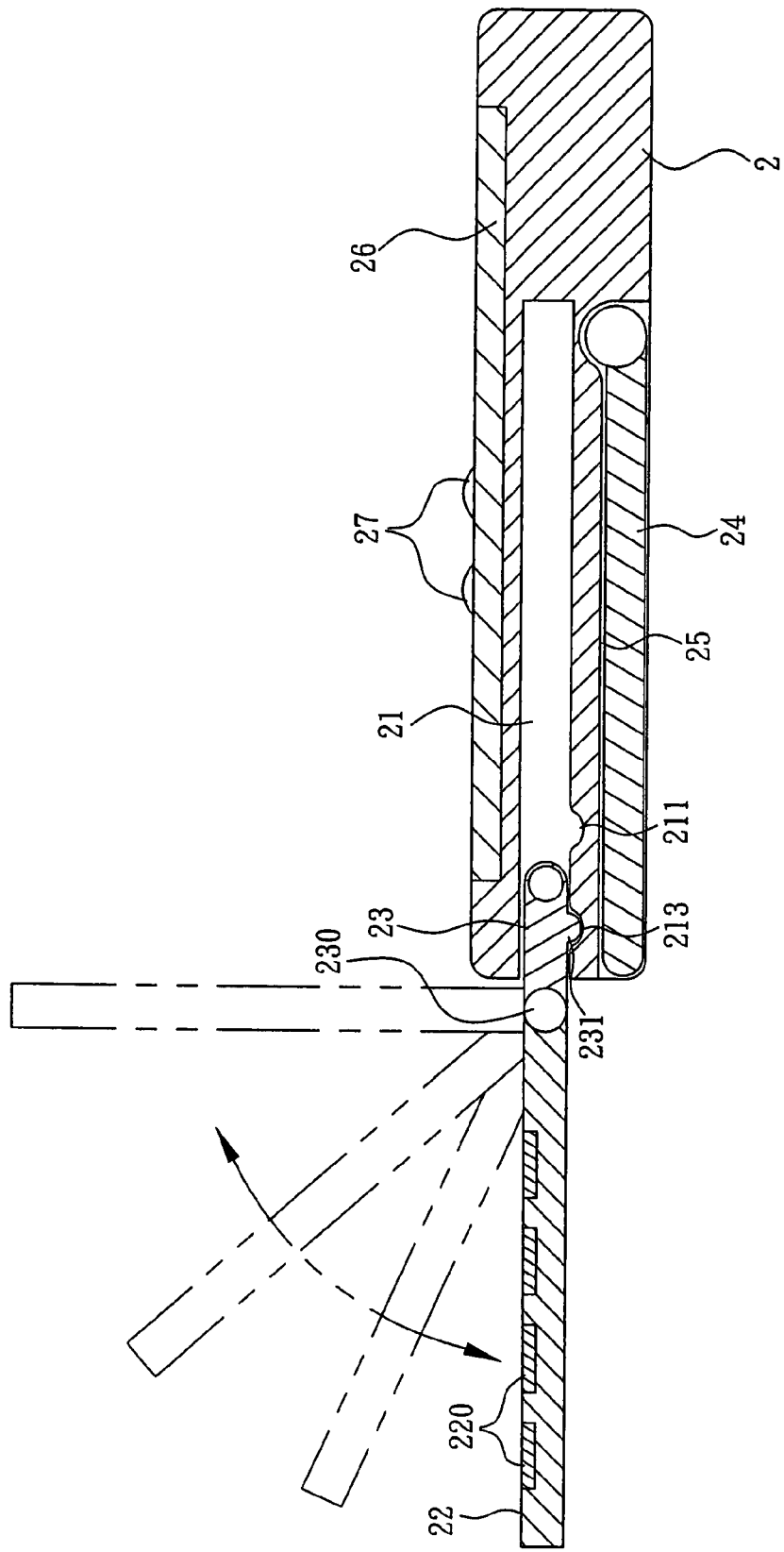
FIG. 4 also shows the portable electronic apparatus having an extendable keyboard in use of a preferred embodiment of the present invention.

Please refer to FIG. 4, in said embodiment, the restraint part 231 engages with the second limit part 213 while the sliding parts 23 slide outwardly, which makes the sliding parts 23 positioning at another location within the storage slot 21 and the keyboard 22 positioning at the another location that the keyboard 22 is able to turn towards the top side of the main body 2. Thus, users may utilize the keyboard 22 laying on the plane surface to input data or commands while the portable electronic apparatus stands on the plane surface.

Please refer to FIGS. 3 and 4, in said embodiment, both the first limit part 211 and the second limit part 213 are pits for holding the restraint part 231 so as to position the keyboard 22 at the location that said plurality of buttons 220 are exposed out of the storage slot 21 or the another location that the keyboard 22 is able to turn towards the top side of the main body 2. Besides, both sides of the storage slot 21 may set tracks respectively to which the other ends of the sliding parts 23 may be slidably coupled so that the sliding parts 23 may slide within the storage slot 21 smoothly.

Please refer to FIG. 5, in said embodiment, a concave slot 25 extends from the position of the support part 24 on the bottom side of the main body 2 for holding the support part 24. The support part 24 and the main body 2 are joined together as a whole while the concave slot 25 holds the support part 24. When one end of the support part 24 is separated from concave slot 25, the main body 2 may stand on the plane surface with the support of the support part 24, thus makes the portable electronic apparatus more compact and easier to carry.

Please refer to FIG. 2, in said embodiment, there's a screen 26 on the top side of the main body 2 for display. On the main body 2, a plurality of control buttons 27 are disposed on both sides of the screen 26 for users to control the portable electronic apparatus. Moreover, the portable electronic apparatus may be an Ultra Mobile PC (UMPC for short). With the portable electronic apparatus having an extendable keyboard of the present invention, the problems of the conventional UMPC that users are required to purchase extra keyboards, the base makes the UMPC more complicated, and inconvenience of carrying the keyboard would be solved perfectly.

While the invention herein disclosed has been described by means of specific embodiments, numerous modifications and variations could be made thereto by those skilled in the art without departing from the scope and spirit of the invention set forth in the claims.

What is claimed is:

1. A portable electronic apparatus having an extendable keyboard, comprising
    a main body having a storage slot extending inwardly at a front edge of said main body and a first limit part disposed at both sides of said storage slot near the front edge of said main body while a second limit part is disposed at both sides of said storage slot between said first limit part and the front edge of said main body;
    a keyboard disposed between both sides of said storage slot and with a plurality of buttons on one side of said keyboard; and
    two sliding parts disposed between the keyboard and both sides of the storage slot respectively, wherein one end of each sliding part is pivotally coupled to one side of said keyboard respectively while the other end extends towards one side of said storage slot and is slidably coupled to the corresponding side of said storage slot respectively, said plurality of buttons are exposed out of said storage slot while said sliding parts slide to positions corresponding to said first limit part, and said keyboard is able to turn towards a top side of said main body while said sliding parts slide to positions corresponding to said second limit part;
    wherein a support part is pivotally coupled to a bottom side of said main body; and
    wherein a restraint part is disposed between the two ends of each said sliding part respectively, said plurality of buttons are exposed out of said storage slot while said sliding parts slide to the positions that said restraint part engages with said first limit part, and said keyboard is able to turn towards the top side of said main body while said sliding parts slide to the positions that said restraint part engages with said second limit part.

2. A portable electronic apparatus having an extendable keyboard of claim 1, wherein both said first limit part and said second limit part are pits.

3. A portable electronic apparatus having an extendable keyboard of claim 2, wherein a concave slot extends from the position of said support part on the bottom side of said main body for holding said support part.

4. A portable electronic apparatus having an extendable keyboard of claim 3, wherein a screen is disposed on the top side of said main body.

5. A portable electronic apparatus having an extendable keyboard of claim 4, wherein a plurality of control buttons are disposed at both sides of said screen of said main body.

6. A portable electronic apparatus having an extendable keyboard of claim 5, wherein said portable electronic apparatus is an Ultra-mobile PC.

* * * * *